United States Patent
Potnis et al.

(10) Patent No.: US 10,831,618 B1
(45) Date of Patent: Nov. 10, 2020

(54) METHOD AND APPARATUS FOR MOUNTING AND UNMOUNTING A STABLE SNAPSHOT COPY OF A USER FILE SYSTEM

(71) Applicant: EMC IP HOLDING COMPANY LLC, Hopkinton, MA (US)

(72) Inventors: Ajay Potnis, Pune (IN); Kiran Halwai, Pune (IN); Amit Dharmadhikari, Pune (IN); Rashmi Shashidhar, Bangalore (IN); Pavan YM, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 86 days.

(21) Appl. No.: 16/263,230

(22) Filed: Jan. 31, 2019

(51) Int. Cl.
G06F 11/14 (2006.01)
H04L 29/08 (2006.01)
G06F 9/455 (2018.01)
G06F 16/11 (2019.01)

(52) U.S. Cl.
CPC .......... *G06F 11/1474* (2013.01); *G06F 9/455* (2013.01); *G06F 11/1435* (2013.01); *G06F 11/1443* (2013.01); *G06F 16/128* (2019.01); *H04L 67/1097* (2013.01); *G06F 2201/82* (2013.01)

(58) Field of Classification Search
CPC .............. G06F 11/1474; G06F 11/1435; G06F 11/1443; G06F 16/128; H04L 67/1097
See application file for complete search history.

(56) References Cited

U.S. PATENT DOCUMENTS

| | | | |
|---|---|---|---|
| 7,769,722 B1* | 8/2010 | Bergant | G06F 16/184 707/681 |
| 8,706,833 B1* | 4/2014 | Bergant | G06F 16/1756 709/214 |
| 9,542,396 B1* | 1/2017 | Pawar | G06F 11/1471 |
| 9,842,031 B1* | 12/2017 | Kharatishvili | G06F 11/1474 |
| 2005/0193245 A1* | 9/2005 | Hayden | G06F 11/2069 714/13 |
| 2007/0180306 A1* | 8/2007 | Soran | G06F 3/0619 714/5.11 |
| 2007/0239944 A1* | 10/2007 | Rupanagunta | G06F 3/0664 711/147 |
| 2012/0166576 A1* | 6/2012 | Orsini | G06F 11/1453 709/217 |
| 2013/0124798 A1* | 5/2013 | Aszmann | G06F 11/1076 711/114 |

* cited by examiner

*Primary Examiner* — Yolanda L Wilson
(74) *Attorney, Agent, or Firm* — Anderson Gorecki LLP

(57) ABSTRACT

A storage system includes a storage array having physical storage resources, a Software Defined Network Attached Storage (SDNAS) process running in an emulation on the storage system, a user file system having user file system data stored in the storage array that is accessed by the SDNAS process via a first Thin Logical Unit (TLU) storage volume mounted on an emulation operating system, a snapshot copy of the user file system stored in the storage array, and control logic. In some embodiments, the control logic is configured to associate a logical view of the snapshot copy of the user file system to a second TLU, mount the second TLU on the emulation operating system as a snapshot copy file system, and replay pending transactions and sub-transactions of the user file system on the snapshot copy file system to bring the snapshot copy file system to a stable state.

17 Claims, 4 Drawing Sheets

METHOD AND APPARATUS FOR MOUNTING AND UNMOUNTING A STABLE SNAPSHOT COPY OF A USER FILE SYSTEM

BACKGROUND

This disclosure relates to computing systems and related devices and methods, and, more particularly, to a method and apparatus for mounting a stable snapshot copy of a user file system and unmounting the snapshot copy of the user file system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method for mounting and unmounting a stable snapshot copy of a user file system includes creating a user file system on a Virtual Data Mover (VDM) application instantiated in an emulation executing on a storage system, adding data to the user file system from a client interfaced with the VDM application over a communication network, and storing, by the storage system, the data associated with the user file system in a first region of physical storage resources of the storage system associated with a first Thin Logical Unit (TLU). The method also includes creating a snapshot copy of the user file system by the storage system, storing the snapshot copy of the user file system in a second region of the physical storage resources of the storage system, associating a logical view of the snapshot copy of the user file system to a snapshot copy TLU and exporting the logical view to the VDM application, mounting, by the VDM application, the snapshot copy TLU as a snapshot copy file system, and replaying pending transactions and sub-transactions of the user file system on the snapshot copy file system to bring the snapshot copy file system to a stable state.

In some embodiments, the emulation includes a local operating system and the VDM application is executing as a process in the context of the local operating system, and the step of mounting the snapshot copy TLU as the snapshot copy file system comprises creating a logical volume for the snapshot copy TLU in the local operating system. In some embodiments, the local operating system has a file system layer, and the pending transactions and sub-transactions are transactions and sub-transactions on the user file system at the file system layer.

In some embodiments, the method further includes performing write operations on the snapshot copy file system to determine performance of the snapshot copy file system.

In some embodiments, the method further includes unmounting the snapshot copy TLU after performing the write operations. In some embodiments, unmounting the snapshot copy TLU causes all write operations on the snapshot copy file system to be lost to cause the snapshot copy of the user file system to revert to an original state. In some embodiments, unmounting the snapshot copy TLU causes all replayed pending transactions and sub-transactions to be lost to cause the snapshot copy of the user file system to revert to an original state.

In some embodiments, the method further includes re-mounting, by the VDM application, the snapshot copy TLU as the snapshot copy file system, and replaying pending transactions and sub-transactions of the user file system on the snapshot copy file system to again bring the snapshot copy file system to stable state.

In some embodiments, the method further includes testing operation of the user file system by iteratively mounting the snapshot copy TLU as the snapshot copy file system, bringing the snapshot copy file system to a stable state, using the snapshot copy TLU to perform write simulations, and unmounting the snapshot copy TLU to cause all write operations and replayed pending transactions and sub-transactions to be lost so that the snapshot copy of the user file system reverts to its original state.

In some embodiments, a storage system includes a storage array having physical storage resources, a Software Defined Network Attached Storage (SDNAS) process running in an emulation on the storage system, the emulation having an operating system, a user file system having user file system data stored in the storage array that is accessed by the SDNAS process via a first Thin Logical Unit (TLU) storage volume mounted on the emulation operating system, a snapshot copy of the user file system stored in the storage array, and control logic. In some embodiments, the control logic is configured to associate a logical view of the snapshot copy of the user file system to a second TLU, mount the second TLU on the emulation operating system as a snapshot copy file system, and replay pending transactions and sub-transactions of the user file system on the snapshot copy file system to bring the snapshot copy file system to a stable state.

In some embodiments, the control logic configured to associate the logical view of the snapshot copy of the user file system to the second TLU is further configured to export the logical view to the SDNAS process.

In some embodiments, the emulation operating system includes an asynchronous input/output layer and the pending transactions and sub-transactions of the user file system are transactions and sub-transactions applied to the user file system at the asynchronous input/output layer of the emulation operating system.

In some embodiments, the control logic is further configured to perform write operations on the snapshot copy file system to determine performance of the snapshot copy file system.

In some embodiments, the control logic is further configured to unmount the second TLU after performing the write operations. In some embodiments, unmounting the second TLU causes all write operations on the snapshot copy file system to be lost to cause the snapshot copy of the user file system to revert to an original state. In some embodiments, unmounting the second TLU causes all replayed pending transactions and sub-transactions to be lost to cause the snapshot copy of the user file system to revert to an original state.

In some embodiments, the control logic is further configured to re-mount, by the SDNAS process, the second TLU as the snapshot copy file system, and replay pending transactions and sub-transactions of the user file system on the snapshot copy file system to once again bring the snapshot copy file system to stable state.

In some embodiments, the control logic is further configured to test operation of the user file system by iteratively mounting the snapshot copy TLU as the snapshot copy file system, bring the snapshot copy file system to a stable state, use the snapshot copy TLU to perform write simulations, and unmount the snapshot copy TLU to cause all write operations and replayed pending transactions and sub-transactions to be lost so that the snapshot copy of the user file system reverts to its original state.

DETAILED DESCRIPTION

Figure 1:
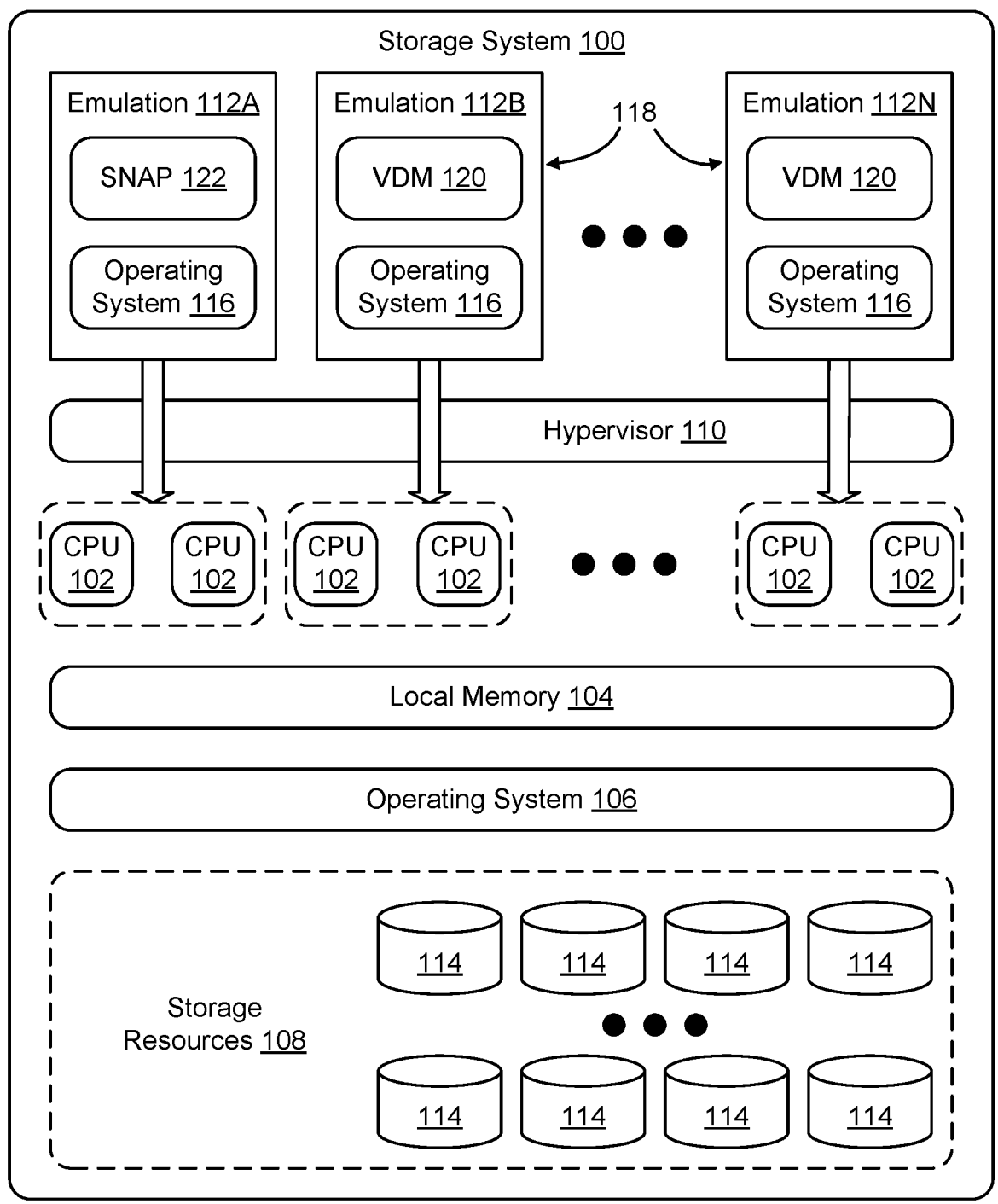
FIG. 1 is a functional block diagram of an example storage system configured to providing for mounting and unmounting a stable snapshot copy of a user file system according to some embodiments of the present disclosure.

FIG. 1 is a functional block diagram of an example storage system 100 for use in a storage environment. As shown in FIG. 1, the storage system 100 has physical resources including a number of CPU processor cores 102, local memory 104, operating system 106, storage resources 108, and other physical resources. A hypervisor 110 abstracts the physical resources of the storage system 100 from emulations 112, and allocates physical resources of storage system 100 for use by the emulations 112. In some embodiments, a given storage system 100 may have physical storage resources 108 that are implemented using an array of physical storage devices 114, which may be implemented using optical disc drives or a number of other storage technologies.

Each emulation 112 has an operating system 116 and one or more application processes running in the context of the operating system 116. As shown in FIG. 1, in some embodiments, one or more of the emulations 112 instantiated on storage system 100 implements one or more Virtual Network Attached Storage (VNAS) software applications configured to enable the emulation 112 to implement a VNAS server 118 on a communication network. As used herein, the term "Virtual Data Mover" (VDM) 120 will be used to refer to one or more software applications configured to execute in an emulation 112 to enable the emulation 112 to implement a VNAS server 118 on the communication network. In the example shown in FIG. 1, emulations 112B-112N include VDM applications 120 and, as such, are configured to implement VNAS servers 118 on the communication network.

Figure 2:
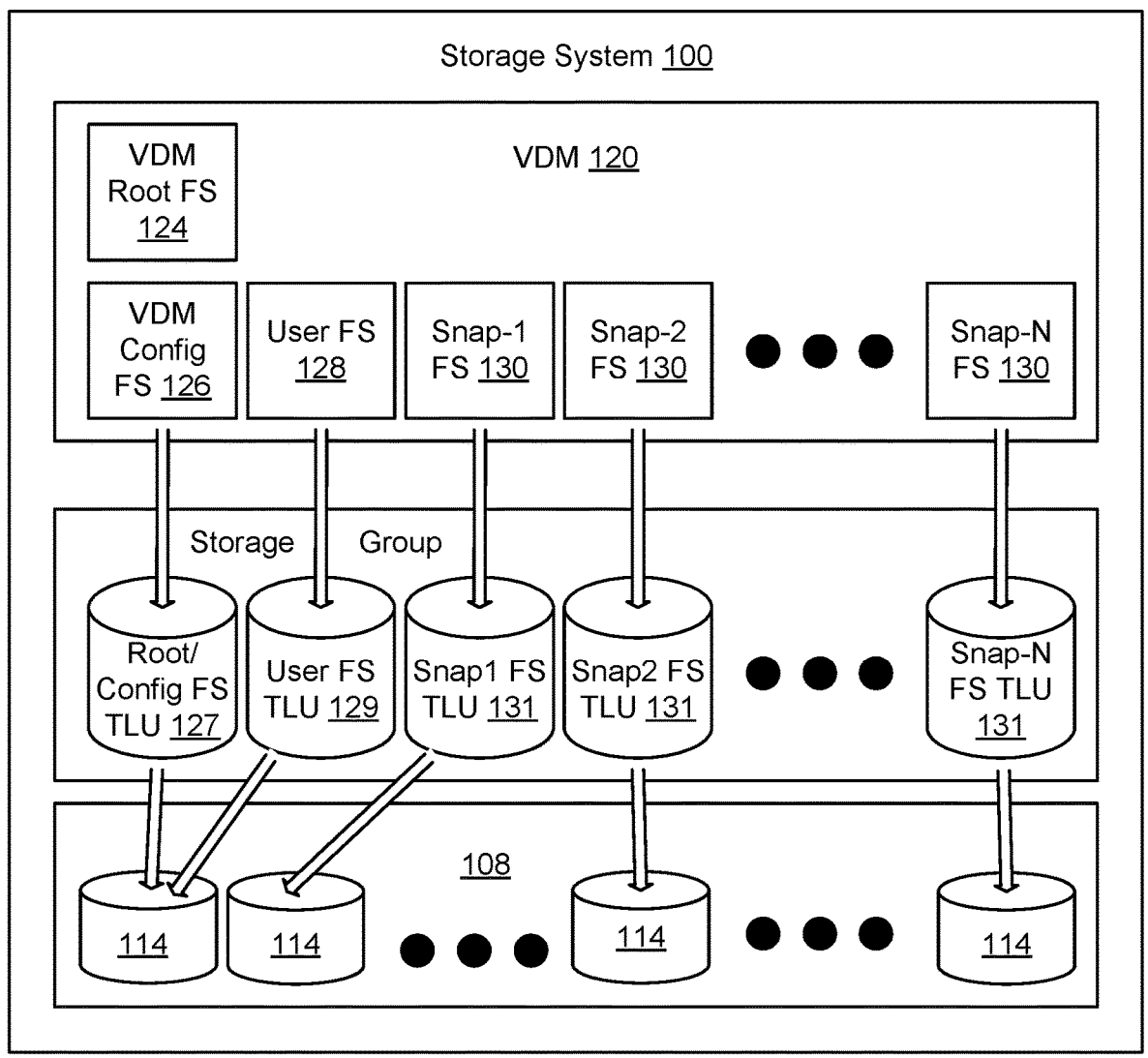
FIG. 2 is a functional block diagram of one emulation of the storage system of FIG. 1 according to some embodiments of the present disclosure.

FIG. 2 is a functional block diagram of one of the emulations 112 of the storage system 100 of FIG. 1, according to some embodiments of the present disclosure. As shown in FIG. 2, in some embodiments a Virtual Data Mover (VDM) 120 instantiated in emulation 112 on storage system 100 includes a VDM root file system 124 and a VDM configuration file system 126. The VDM root file system 124 contains data describing the VDM 120, and the VDM configuration file system 126 describes how the data managed by the VDM 120 is stored in physical storage resources 108 of the storage system 100.

The storage system 100 presents physical storage resources 108 to the VDM 120 as a set of logical storage volumes (LUNs), referred to herein as Thin Logical Units (TLUs). A TLU is a logical construct which enables the physical storage resources 108 to be abstracted from the VDM 120. The logical storage volume is referred to as "thin" because actual physical storage resources 108 are only allocated by the storage system 100 to the TLU 120 as needed. Thus, the amount of storage capacity of physical storage resources 108 allocated to a TLU will increase and decrease over time as the file system stored on the TLU increases and decreases in size.

In some embodiments, the VDM root file system 124 and VDM configuration file system 126 are stored in a first TLU referred to herein as a Root/configuration file system TLU 127.

Data associated with a data client is stored in a user file system 128. A given VDM may manage one or more user file systems 128. Each user file system 128 is stored in a separate TLU referred to herein as a user file system TLU 129. Metadata describing the mapping of the user file system TLU 129 to physical storage resources 108 is contained in the VDM configuration file system 126.

One or more of the emulations 112 may execute applications configured to control how the storage system 100 manages the underlying storage resources 108. Of relevance to this disclosure, for example, one application that may be executing in an emulation 112 on storage system 100 is a snapshot application (SNAP) 122 (see FIG. 1) configured to enable the storage system 100 to provide point in time data copying. Multiple SNAP applications 122 may be executing on a given storage system 100 at any point in time. A "snapshot," as that term is used herein, is a copy of data as that data existed at a particular point in time. A snapshot of a file system, accordingly, is a copy of the data of the file system as the data contained in the file system existed at the point in time when the snapshot of the file system was created. In some embodiments, the storage system 100 creates snapshot copies 130 of user file system 128 by copying data at the block level on physical storage resources 108 that are being used to store the user file system TLU 129. Each time a snapshot copy 130 is created, it is stored in physical storage resources 108. Snapshot copies 130 may be dynamically associated with TLUs to enable data from the snapshot copies 130 to be accessed as discussed in greater detail in U.S. patent application Ser. No. 16/127,136, filed Oct. 31, 2018, entitled Method and Apparatus for Dynamic Binding and Unbinding Thin Logical Storage Volumes to Snapshots of a File System, the content of which is hereby incorporated herein by reference.

In some embodiments, the SNAP application 122 periodically creates point in time copies (snapshot copy) of the data associated with the user file system 128. Since the SNAP application is operating in an emulation 112 and is configured to control operation of the storage system 100, SNAP application 122 executes to perform point in time copies of the user file system independent of the VDM 120. In some embodiments the storage system 100 creates snapshot copies 130 by copying data at the block level on physical storage resources 108 that are being used to store the user file system TLU 129.

In some embodiments, each time the snapshot application 122 creates a snapshot copy 130 of the user file system 128, the snapshot copy 130 of the user file system 128 is stored in physical storage resources 108 of the storage system 100. If the user file system 128 needs to be restored to an earlier point in time, one of the snapshot copies may be selected and the user file system may be remounted from the snapshot copy 130 of the user file system 128 as the user file system 128 appeared at the time of creation of the snapshot copy 130 of the user file system 128.

There are instances where it would be advantageous to mount one of the snapshot copies 130 of the user file system 128. For example, in some instances it may be desirable to test performance of a database using different CPU 102 and memory 104 resource configurations/allocations. Accordingly, in some embodiments, a system and method are provided for mounting and unmounting a stable snapshot copy 130 of a user file system 128.

Figure 4:
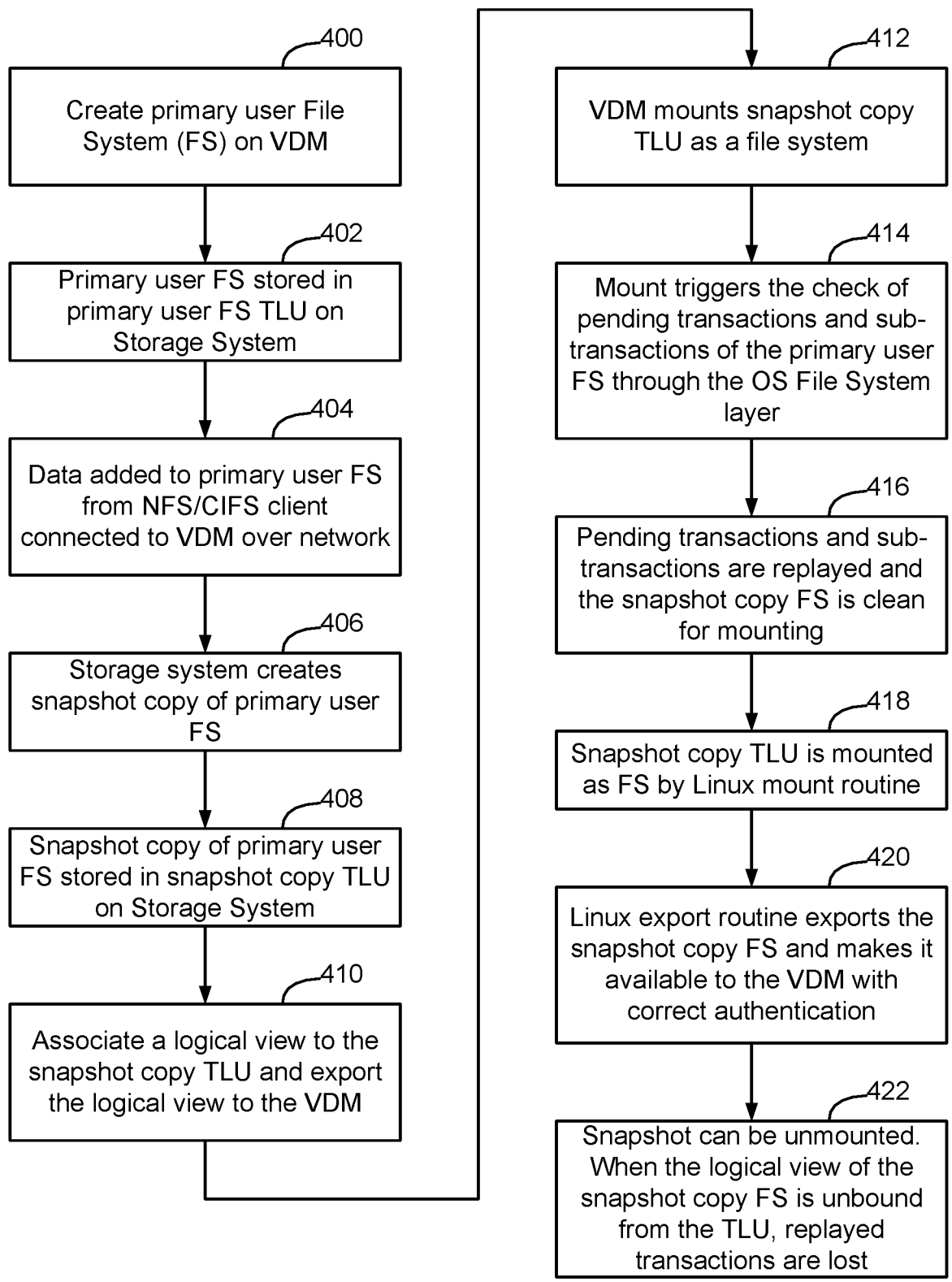
FIG. 4 is a flow chart of a method of mounting a stable snapshot copy of a user file system according to some embodiments of the present disclosure.

FIG. 4 is a flow chart of an example method of mounting a snapshot copy 130 of a user file system 128. As shown in FIG. 4, initially a primary user file system 128 is created on a VDM 120 running in an emulation 112 (FIG. 4, block 400). The primary user file system 128 is stored in a user file system TLU 129 in a storage group by storage system 100 (FIG. 4, block 402). The particular storage group used to house user file system TLU 129 will depend on the Service Level Objective (SLO) of the user file system 128.

Data is added to the user file system 128 from Network File System/Common Internet File System (NFS/CIFS) client connected to the VDM 120 over a communication network (FIG. 4, block 404). As a matter of course, the SNAP application 122 executing in a separate emulation 112 on storage system 100, causes the storage system 100 to create snapshot copies 130 of the user file system 128 (FIG. 4, block 406). In some embodiments the storage system 100 creates snapshot copies 130 by copying data at the block level on physical storage resources 108 that are being used to store the user file system TLU 129. The snapshot copies 130 are stored in snapshot copy TLUs 131 on storage system 100 (FIG. 4, block 408). Optionally, the snapshot copy file system 130 may be dynamically bound to a snapshot copy TLU 131 such that a snapshot copy file system 130 is only bound to a TLU when a VDM 120 requires access to the snapshot copy file system.

Figure 3:
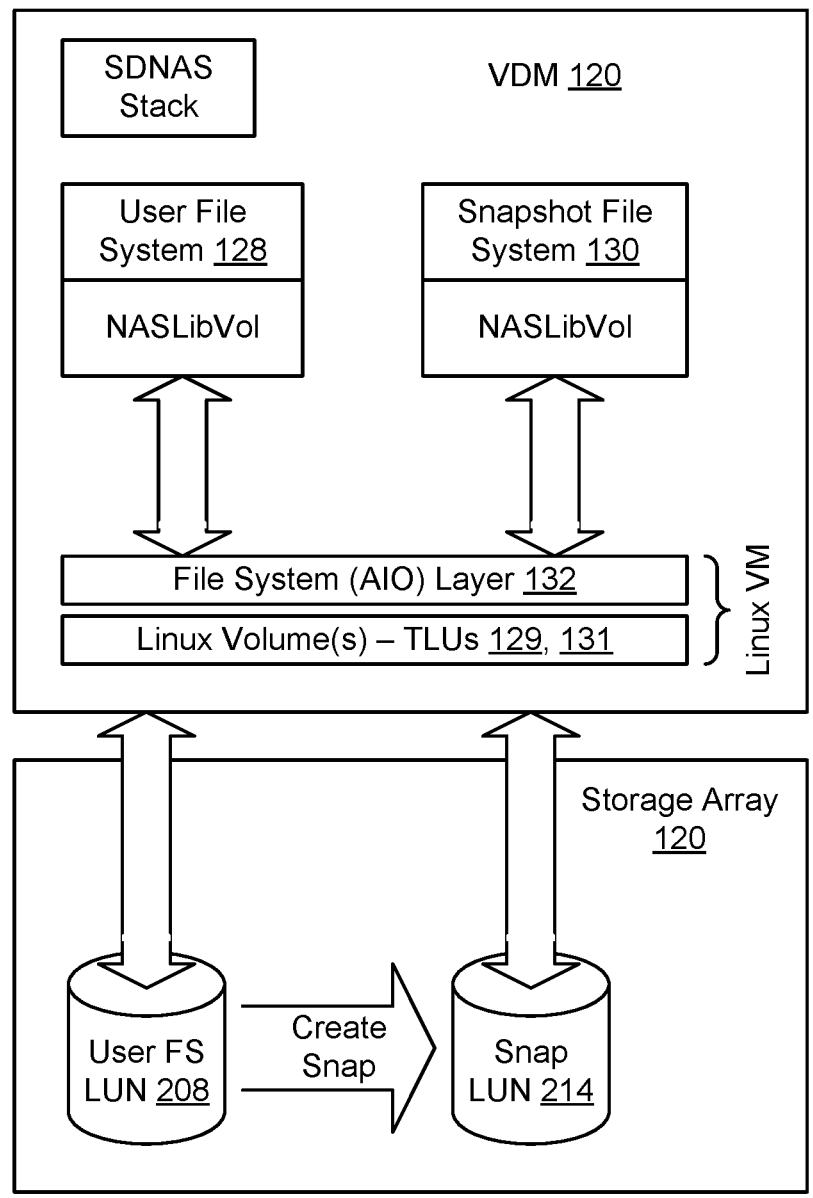
FIG. 3 is a functional block diagram of the emulation of FIG. 2 in greater detail illustrating an apparatus for mounting and unmounting a stable snapshot copy of a user file system according to some embodiments of the present disclosure.

FIG. 3 shows creation of a snapshot copy file system 130 in greater detail. As shown in FIG. 3, the storage array 109 containing storage resources 108 of FIG. 1, periodically creates snapshot copies of a user file system at the block level. The user file system is shown in FIG. 3 as being stored in storage array as LUN 208. When the storage array 109 creates the snapshot copy of the user file system, the data associated with the snapshot copy of the user file system is stored in SNAP LUN 214. If the snapshot copy of the user file system is to be made available to VDM 120, the data associated with the snapshot copy of the user file system is bound to a TLU 131, which is then mounted as a Linux Volume in the Linux Virtual Machine of Operating System 116. The file system asynchronous input/output layer 132 replays pending transactions of user file system 128 on the snapshot copy of the user file system 130 to bring the snapshot copy into a stable state, and then makes the snapshot file system 130 available to the VDM 120 as a Network Attached Storage Library Volume (NASLibVol). FIG. 2 shows several snapshot copy file systems mounted and available to VDM 120. However, not every snapshot copy of user file system is required to be made available to VDM 120 and, in some embodiments, a single snapshot copy 130 is iteratively mounted, brought to a stable state, and then unmounted as described in greater detail herein.

If it becomes desirable to use one of the snapshot copies 130, it is first necessary to mount the snapshot copy file system 130 in the operating system 116 of the emulation 112. Accordingly, in some embodiments, a logical view of the snapshot copy file system 130 is created and associated with the snapshot copy TLU 131 that is to be made available to the VDM 120 (FIG. 4, block 410). The logical view is exported to the VDM 120 (FIG. 4, block 410) and the VDM 120 mounts the snapshot TLU 131 as a file system in the OS 116 (FIG. 4, block 412). In some embodiments where operating system 116 is a Linux operating system, mounting a file system entails making the particular file system accessible at a certain point in the Linux directory tree. For example, a directory entry for the snapshot copy file system 130 may be created in the directory tree using a Linux command "$ mkdir" and then a Linux mount command "$ mount -t" may be used to associate snapshot copy TLU 131 to the directory entry.

In some embodiments, the mount triggers a check of pending transactions and sub-transactions of the user file system 128 on the user file system TLU 129 through the file system layer 132 (see FIG. 3). One example file system layer is a SADE Asynchronous Input/Output (AIO) which may be used in connection with a Linux operating system 116 (FIG. 4, block 414). Any pending transactions and sub-transactions are replayed and the snapshot file system 130 is clean for mounting (FIG. 4, block 416). Accordingly, the operating system mount routine then mounts the snapshot TLU 131 as a file system in the operating system 116 (FIG. 4, block 418). The Linux export routine exports the snapshot copy file system 130 and makes it available to the VDM 120 with correct authentication (FIG. 4, block 420). The VDM 120 then can use the snapshot copy file system 130 stored at snapshot TLU 131 for subsequent read/write operations by NFS/CIFS client.

In some embodiments, the SNAP application 122 of storage system 100 provides read/write snapshot copies of the user file system 128. During the mount process, the VDM brings the snapshot copy file system 130 to a stable state and then mounts it as a Read Only file system. By mounting the snapshot copy file system 130 as a read only file system, any subsequent transactions will continue to be executed on the user file system 128 such that the data of the user file system 128 is not affected by the presence of the duplicate snapshot copy file system 130. However, the read only snapshot copy file system 130 may be used, for example, in connection with testing the performance of the user file system as noted below.

The snapshot file system may subsequently be unmounted, for example using a Linux unmount command "$ unmount" (FIG. 4, block 422). When the logical view of the snapshot copy file system 130 is unbound from the snapshot TLU 131, the replayed transactions and sub-transactions are lost. If the snapshot copy file system 131 is once again mounted, the transactions and sub-transactions will be replayed again to bring the snapshot copy file system 131 to a stable point once again.

Mounting and subsequently unmouting a stable read/write snapshot copy 130 of user file system 128 enables write simulations to be performed on the user file system 128. Specifically, when the snapshot copy file system 130 is mounted, by replaying all pending transactions and sub-transactions, the snapshot copy file system 130 can be made stable such that it has the same data as the user file system 128. The snapshot copy file system 130 can then be used for tests, for example to do write simulations to find performance characteristics of the server, the data, database, etc. Once the tests are completed, the snapshot copy file system 130 can be unmounted and the replayed transactions are lost. For example, once the tests are conducted, the snapshot copy file system 130 can be unmounted and the logical view of the snapshot copy file system 130 can be unbound from the snapshot TLU 131. The unbind releases all the blocks that were modified during the simulation.

The same snapshot copy file system can be used iteratively by binding the snapshot copy file system to a TLU, replaying transactions and sub-transactions to clean the file system, and mounting the file system. Accordingly, multiple different simulations may be run on the same copy of the user files system to obtain performance characteristic of the user file system in different execution environments without affecting the user file system, such as to determine performance of the user file system with different CPU and memory changes. Since a snapshot copy of the user file system is used to implement the performance testing, the user file system 130 is not affected by the tests.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for mounting and unmounting a stable snapshot copy of a user file system, comprising the steps of:
   creating a user file system on a Virtual Data Mover (VDM) application instantiated in an emulation executing on a storage system;
   adding data to the user file system from a client interfaced with the VDM application over a communication network;
   storing, by the storage system, the data associated with the user file system in a first region of physical storage resources of the storage system associated with a first Thin Logical Unit (TLU);
   creating a snapshot copy of the user file system by the storage system;
   storing the snapshot copy of the user file system in a second region of the physical storage resources of the storage system;
   associating a logical view of the snapshot copy of the user file system to a snapshot copy TLU and exporting the logical view to the VDM application;
   mounting, by the VDM application, the snapshot copy TLU as a snapshot copy file system; and
   replaying pending transactions and sub-transactions of the user file system on the snapshot copy file system to bring the snapshot copy file system to a stable state;
   wherein the emulation includes a local operating system and the VDM application is executing as a process in the context of the local operating system, and wherein the step of mounting the snapshot copy TLU as the snapshot copy file system comprises creating a logical volume for the snapshot copy TLU in the local operating system.

2. The method of claim 1, wherein the local operating system has a file system layer, and wherein the pending transactions and sub-transactions are transactions and sub-transactions on the user file system at the file system layer.

3. A method for mounting and unmounting a stable snapshot copy of a user file system, comprising the steps of:
   creating a user file system on a Virtual Data Mover (VDM) application instantiated in an emulation executing on a storage system;
   adding data to the user file system from a client interfaced with the VDM application over a communication network;
   storing, by the storage system, the data associated with the user file system in a first region of physical storage resources of the storage system associated with a first Thin Logical Unit (TLU);
   creating a snapshot copy of the user file system by the storage system;
   storing the snapshot copy of the user file system in a second region of the physical storage resources of the storage system;
   associating a logical view of the snapshot copy of the user file system to a snapshot copy TLU and exporting the logical view to the VDM application;
   mounting, by the VDM application, the snapshot copy TLU as a snapshot copy file system;
   replaying pending transactions and sub-transactions of the user file system on the snapshot copy file system to bring the snapshot copy file system to a stable state; and
   performing write operations on the snapshot copy file system to determine performance of the snapshot copy file system.

4. The method of claim 3, further comprising unmounting the snapshot copy TLU after performing the write operations.

5. The method of claim 4, wherein unmounting the snapshot copy TLU causes all write operations on the snapshot copy file system to be lost to cause the snapshot copy of the user file system to revert to an original state.

6. The method of claim 4, wherein unmounting the snapshot copy TLU causes all replayed pending transactions and sub-transactions to be lost to cause the snapshot copy of the user file system to revert to an original state.

7. The method of claim 6, further comprising re-mounting, by the VDM application, the snapshot copy TLU as the snapshot copy file system; and
replaying pending transactions and sub-transactions of the user file system on the snapshot copy file system to again bring the snapshot copy file system to stable state.

8. A method for mounting and unmounting a stable snapshot copy of a user file system, comprising the steps of:
creating a user file system on a Virtual Data Mover (VDM) application instantiated in an emulation executing on a storage system;
adding data to the user file system from a client interfaced with the VDM application over a communication network;
storing, by the storage system, the data associated with the user file system in a first region of physical storage resources of the storage system associated with a first Thin Logical Unit (TLU);
creating a snapshot copy of the user file system by the storage system;
storing the snapshot copy of the user file system in a second region of the physical storage resources of the storage system;
associating a logical view of the snapshot copy of the user file system to a snapshot copy TLU and exporting the logical view to the VDM application;
mounting, by the VDM application, the snapshot copy TLU as a snapshot copy file system;
replaying pending transactions and sub-transactions of the user file system on the snapshot copy file system to bring the snapshot copy file system to a stable state; and
testing operation of the user file system by iteratively mounting the snapshot copy TLU as the snapshot copy file system, bringing the snapshot copy file system to a stable state, using the snapshot copy TLU to perform write simulations, and unmounting the snapshot copy TLU to cause all write operations and replayed pending transactions and sub-transactions to be lost so that the snapshot copy of the user file system reverts to its original state.

9. A storage system, comprising:
a storage array having physical storage resources;
a Software Defined Network Attached Storage (SDNAS) process running in an emulation on the storage system, the emulation having an operating system;
a user file system having user file system data stored in the storage array that is accessed by the SDNAS process via a first Thin Logical Unit (TLU) storage volume mounted on the emulation operating system;
a snapshot copy of the user file system stored in the storage array; and
control logic configured to:
associate a logical view of the snapshot copy of the user file system to a second TLU;
mount the second TLU on the emulation operating system as a snapshot copy file system; and
replay pending transactions and sub-transactions of the user file system on the snapshot copy file system to bring the snapshot copy file system to a stable state.

10. The storage system of claim 9, wherein the control logic configured to associate the logical view of the snapshot copy of the user file system to the second TLU is further configured to export the logical view to the SDNAS process.

11. The storage system of claim 9, wherein the emulation operating system includes an asynchronous input/output layer and the pending transactions and sub-transactions of the user file system are transactions and sub-transactions applied to the user file system at the asynchronous input/output layer of the emulation operating system.

12. The storage system of claim 9, further comprising control logic configured to perform write operations on the snapshot copy file system to determine performance of the snapshot copy file system.

13. The storage system of claim 12, further comprising control logic configured to Currently Amended the second TLU after performing the write operations.

14. The storage system of claim 13, wherein unmounting the second TLU causes all write operations on the snapshot copy file system to be lost to cause the snapshot copy of the user file system to revert to an original state.

15. The storage system of claim 13, wherein unmounting the second TLU causes all replayed pending transactions and sub-transactions to be lost to cause the snapshot copy of the user file system to revert to an original state.

16. The storage system of claim 15, further comprising control logic configured to re-mount, by the SDNAS process, the second TLU as the snapshot copy file system; and
replay pending transactions and sub-transactions of the user file system on the snapshot copy file system to once again bring the snapshot copy file system to stable state.

17. The storage system of claim 9, further comprising control logic configured to test operation of the user file system by iteratively mounting the snapshot copy TLU as the snapshot copy file system, bring the snapshot copy file system to a stable state, use the snapshot copy TLU to perform write simulations, and unmount the snapshot copy TLU to cause all write operations and replayed pending transactions and sub-transactions to be lost so that the snapshot copy of the user file system reverts to its original state.

* * * * *